US012201862B2

(12) United States Patent
Petermann et al.

(10) Patent No.: US 12,201,862 B2
(45) Date of Patent: Jan. 21, 2025

(54) E-EXTINGUISHING LANCE

(71) Applicants: MURER-Feuerschutz GmbH, Einbeck (DE); Volkswagen Aktiengesellschaft, Wolfsburg (DE)

(72) Inventors: Matthias Petermann, Langelsheim (DE); Albrecht Reschke, Einbeck (DE)

(73) Assignees: MURER-Feuerschutz GmbH, Einbeck (DE); Volkswagen Aktiengesellschaft, Wolfsburg (DE)

( * ) Notice: Subject to any disclaimer, the term of this patent is extended or adjusted under 35 U.S.C. 154(b) by 206 days.

(21) Appl. No.: 17/923,248

(22) PCT Filed: May 7, 2021

(86) PCT No.: PCT/EP2021/062143
§ 371 (c)(1),
(2) Date: Nov. 4, 2022

(87) PCT Pub. No.: WO2021/224457
PCT Pub. Date: Nov. 11, 2021

(65) Prior Publication Data
US 2023/0241433 A1 Aug. 3, 2023

(30) Foreign Application Priority Data
May 7, 2020 (DE) ..................... 20 2020 102 574.0

(51) Int. Cl.
*A62C 3/07* (2006.01)
*A62C 3/16* (2006.01)
*A62C 31/22* (2006.01)

(52) U.S. Cl.
CPC .................. *A62C 3/16* (2013.01); *A62C 3/07* (2013.01); *A62C 31/22* (2013.01)

(58) Field of Classification Search
CPC .......... H01R 13/65802; H01R 13/6596; H01R 9/0512; H01R 9/2691; H01R 3/00;
(Continued)

(56) References Cited

U.S. PATENT DOCUMENTS 4,219,084 A * 8/1980 Frosch .................. A62C 31/22 169/70
4,802,535 A 2/1989 Bakke
(Continued)

FOREIGN PATENT DOCUMENTS

CN 110958903 A 4/2020
DE 10 2016 211 854 B3 8/2017
(Continued)

OTHER PUBLICATIONS

International Search Report for PCT/EP2021/062143, mailed Jul. 20, 2021.
(Continued)

*Primary Examiner* — Christopher R Dandridge
(74) *Attorney, Agent, or Firm* — Collard & Roe, P.C.

(57) ABSTRACT

An extinguishing lance for electrical devices that are burning, has a holding portion having a handle part for operation, an extinguishing-agent feed having a coupling device for connecting a pressure hose for extinguishing agent, and a tubular extinguishing portion, from the free end of which extinguishing agent is introduced, under pressure, into the object that is burning. The extinguishing portion tapers to a point at the free end and has a constricted, hollow flow cross-section for extinguishing agent conducted under pressure. The extinguishing portion and its tapered, additionally hardened end are produced from stainless steel. The extinguishing portion has, at least in the region of the holding portion, a voltage-insulating coating, which is electrically insulating for electric voltages U≥500 V. Thus, the minimum
(Continued)

Figure 1A:
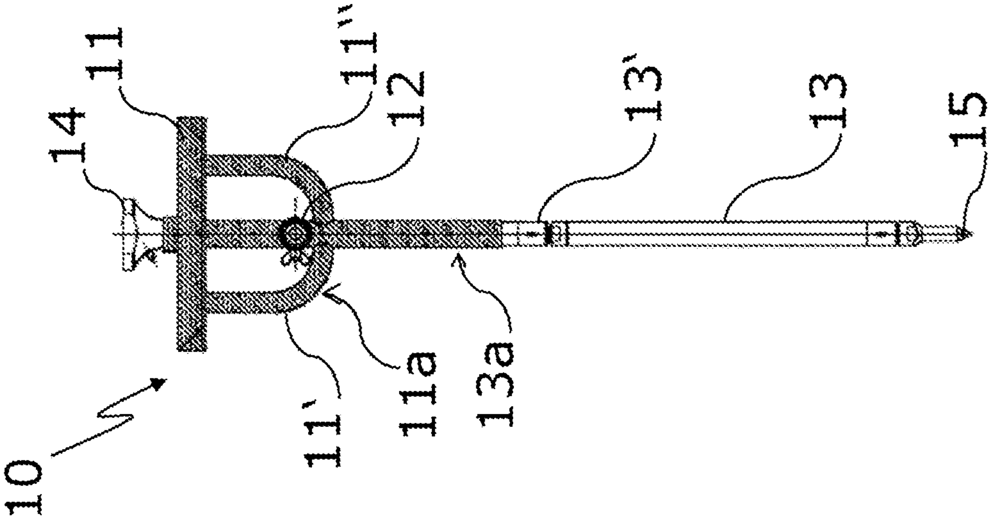

legal requirements for protection against thermal hazards, against mechanical overloads, and against electrical hazards are reliably met.

15 Claims, 6 Drawing Sheets

(58) Field of Classification Search
CPC ........ A62B 3/005; G01R 27/18; A62C 31/22; A62C 3/16; A62C 3/07
See application file for complete search history.

(56) References Cited

U.S. PATENT DOCUMENTS

| | | | | |
|---|---|---|---|---|
| 2002/0179307 | A1 | 12/2002 | Schmidt et al. | |
| 2003/0159837 | A1 | 8/2003 | Itschner | |
| 2013/0112045 | A1* | 5/2013 | Piveronas | B25D 1/14 81/26 |
| 2018/0366845 | A1* | 12/2018 | Albrecht | H01R 9/2691 |

FOREIGN PATENT DOCUMENTS

| | | | | | |
|---|---|---|---|---|---|
| DE | 20 2017 104 411 | U1 | | 8/2017 | |
| EP | 3 263 402 | B1 | | 4/2019 | |
| WO | WO-2019020507 | A1 | * | 1/2019 | A62C 31/22 |

OTHER PUBLICATIONS

English translation of the International Preliminary Report on Patentability in PCT/EP2021/062143, dated Mar. 24, 2022.

* cited by examiner

E-EXTINGUISHING LANCE

CROSS REFERENCE TO RELATED APPLICATIONS

This application is the National Stage of PCT/EP2021/062143 filed on May 7, 2021, which claims priority under 35 U.S.C. § 119 of German Application No. 20 2020 102 574.0 filed on May 7, 2020, the disclosure of which is incorporated by reference. The international application under PCT article 21 (2) was not published in English.

The invention relates to an extinguishing lance for fire-fighting involving electrically charged objects, such as vehicles equipped with an electric motor, wherein the extinguishing lance has a holding portion having a handle part for an operator, an extinguishing agent feed having a coupling device for connecting a pressure hose for liquid extinguishing agent, and a tubular extinguishing portion adjoining the holding portion and, if applicable, the coupling device, from the free end of which extinguishing portion extinguishing agent, under pressure, can be introduced into a burning object, wherein the handle part of the holding portion has a voltage-insulating coating which is designed so as to be electrically insulating even for electric voltages U of between 500 V and 1,000 V, wherein the tubular extinguishing portion is made of a material which has such a high tensile strength $R_m$ that it withstands a mechanical stress $\sigma \geq 500$ N/mm$^2$, and which has a melting temperature $t_s \geq 650°$ C., wherein the tubular extinguishing portion is designed so as to taper geometrically at its free end and has a constricted, hollow flow cross-section for the extinguishing agent conducted through under pressure, wherein the tubular extinguishing portion and also the tapering free end of the tubular extinguishing portion is made of stainless steel, and wherein the tapering free end of the tubular extinguishing portion additionally is hardened.

Such an E-extinguishing lance is known from DE 20 2017 104 411 U1 and from WO 2019/020507 A1.

Conventional extinguishing lances, which, however, are not suitable for extinguishing objects which are subject to high electric voltage, are described in the company catalog of Murer Feuerschutz GmbH of 5/2016-in particular, the "Nebellöschsystem NLS" [mist extinguishing system] shown there.

BACKGROUND OF THE INVENTION

For reasons of environmental and climate protection and sustainability, inter alia, there are currently intensive international efforts to use more electrical energy instead of fossil fuels. In recent years, photovoltaic systems have increasingly been installed on the roofs of buildings, for example. In addition, in the future, individual mobility is to be increasingly made possible by electric drive systems—for example, by electric vehicles.

Up to now, however, little attention has been paid to the fact that such an increased use of electrical energy is also associated with considerable potential hazards.

In view of the numerous fire incidents occurring around the world due to non-functioning or poorly functioning batteries, e.g., in smartphones or notebooks, these potential hazards are already becoming increasingly apparent.

A particularly high risk is seen in the case of fires in the vicinity of electric vehicles, e.g., in hybrid or fully electrically operated vehicles (see, for example, "E-Mobil-Brand in den USA";

https://www.welt.de/motor/news/article120704501/E-Mobil-Brand-in-den-USA.html (retrieved on Nov. 9, 2016).

A particular problem in the case of a fire in such an electric vehicle is that, during extinguishing, there are not only considerable hazards caused by the fire itself and possible self-igniting elements such as lithium-ion batteries, but hazards caused by propagating high voltages or heavy currents due to the high-performance electrics or batteries installed in the vehicle additionally have to be checked. It is therefore important to prevent this effectively.

U.S. Pat. No. 4,802,535 describes a fire-extinguishing lance in which hardened steel pipe is proposed as the material for the tubular extinguishing portion. However, no electrical insulation of any kind for the known extinguishing lance is provided.

US 2003/0159837 A1 discloses a "multipurpose water hammer" having a tapering nozzle which, during use, is intended to penetrate an object to be extinguished. The extinguishing head is placed onto the tubular extinguishing portion at an angle of 90°. For a hammer-like use of this device in an electric vehicle, work would have to be carried out very close to the battery to be extinguished when driving the device into the outer shell of the vehicle in order to achieve any actual effect at all. Furthermore, no electrical insulation of the extinguishing lance is provided or indicated here either. In 2002 and 2003, vehicles having electric drives had probably not yet been thought about, unlike today.

US 2002/0179307 A1 suggests insulation against electric voltage in the case of contact with wires in a building wall, but no insulation against high voltages, as occur in batteries of electric vehicles, for example. In addition, the extinguishing agent is fed in via the end of the known extinguishing lance, such that it is not possible to drive the lance into a vehicle outer shell using a striking tool. Such a conventional extinguishing lance is suitable for extinguishing buildings and possibly also conventionally powered vehicles that are burning, but by no means for extinguishing electric vehicles that are burning, mainly because of the high electrical voltages U>>200 V to be expected therein, in contrast to normal buildings (apart from electrical power plants) and conventional vehicles.

This is demonstrated, inter alia, by the magazine article, "MOBILES LEBEN-WAS, WENN ES BRENNT?" ["Mobile life-what if there's a fire?"], from the magazine, "stern," of Jun. 19, 2019, page 80. Said article shows, in a popularized manner, that in particular electric vehicles having high-voltage batteries, which, as is well known, are to replace conventional vehicles powered by combustion engines as completely as possible in the very near future for environmental reasons, pose a very significant risk to the life and limb of the firefighters who are to extinguish such burning electric vehicles. Obviously, such an extinguishing action with a conventional extinguishing lance of the type described above cannot be carried out with the necessary degree of safety.

Instead, in DE 10 2016 211 854 B3 or EP 3 263 402 B1, a special container is proposed which contains extinguishing water into which a burning electric vehicle is to be completely immersed-a truly desperate idea: Imagine: An electric vehicle catches fire on a busy street. But, instead of extinguishing the burning vehicle in situ, as is usual, the fire department first has to get a huge special container, fill said container with a huge amount of extinguishing water in situ, and then somehow dip the still-burning, but by then probably completely burned-out, electric vehicle into that big container. How this is to be done with a larger vehicle, such as an electrically-powered bus or truck, remains completely unclear.

The magazine article, "ELEKTRISIERENDER EINSATZ" ["Electrifying use"], from the fire department magazine, "BRANDHEISS," in the July-August 2018 issue, page 16, describes, from the point of view of a person skilled in the art (namely, the fire department), the new and very dangerous situation-particularly for firefighting professionals in the field-when extinguishing a burning electric car. Verbatim, said article reads: "Even though the burning electric van had more easily manageable dimensions, the FF Traun volunteers were certainly required." . . . . "Particularly in the first phase, the fire-fighting operation turned out to be risky, but vehicles with an electric drive are to be extinguished and treated entirely differently than conventional passenger cars. A first fire-fighting operation under respiratory protection quickly had an effect, but the vehicle had to be put in a "water bath," as is the case with such fires, because the burned-out and destroyed batteries still pose an enormous fire risk several hours later. Therefore, the destroyed vehicle was escorted on a heavy-duty tow truck by two fire engines with blue lights directly to an industrial area in Traun, where it was placed in a deep water bath which is environmentally protected against leakage." . . . "GROSSER AUFWAND FÜR KLEINES FAHRZEUG" ["Big effort for small vehicle"] . . . .

This underlines the great urgency of finding a technically significantly better, safer, and also much more economical solution to the problems associated with extinguishing burning electric vehicles than is proposed, for example, in DE 10 2016 211 854 B3 or EP 3 263 402 B1.

In addition to the actual extinguishing problems, the extremely negative consequences for the environment must also be considered: After the fire-fighting operation described above, the destroyed vehicle was also placed in a "water bath" and "dunked," at huge effort. However, even beforehand, specifically as a result of the actual extinguishing process, an enormous amount of highly contaminated extinguishing water was released into the environment, which the article does not, however, mention further.

In the event of a vehicle fire, the usual and known mixture of respiratory toxins is generally always produced. In addition, however, other very significant amounts of very dangerous respiratory toxins occur as a result of the "thermal runaway" of the lithium-ion battery. Primarily as a result of the decomposition of the conductive salt in the electrolyte, lithium hexafluorophosphate (LiPF), hydrofluoric acid (HF), phosphoryl fluoride (POF), and phosphoric acid are released. When a burning or still-smoldering electric vehicle is further transported, these dangerous substances continue to escape and contaminate the environment. With the use of the E-extinguishing lance according to the invention, this pollutant load on the environment is also significantly reduced, and only a small amount of water (20-50 liters) is contaminated by the extinguishing operation.

Up to now, firefighters have been prepared for dealing with such safety hazards to only a very limited extent, and usually not at all. In the above articles, it is reported, for example, that the firefighters fighting a fire in an electric vehicle kept or had to keep a clear spatial distance from the electric vehicle, which of course considerably limits the effectiveness of the firefighting or reduces the positive effect of the firefighting measures, which are known per se, if not making them impossible.

Therefore, in order to deal with such extended hazards, a completely new type of E-extinguishing lance is in particular required, which is not only designed for the actual extinguishing per se, but can withstand both thermal and mechanical as well as, in particular, also electrical hazards.

By way of the E-extinguishing lance of the type defined at the outset, according to DE 20 2017 104 411 U1 and WO 2019/020507 A1, the prior art has for the first time succeeded in additionally providing the extinguishing tool with protection against thermal and/or mechanical hazards, as well as, additionally, with high-voltage protection.

However, even this new type of E-extinguishing lance does not completely and comprehensively ensure that the (comparatively strict) legal standards for electrician's tools can be complied with. There is therefore still the risk that, when extinguishing live electrical objects, and in particular when the extinguishing lance is wet, which is quite typical when in use, electric voltages or currents from the electrically non-insulated tubular extinguishing portion reach the operator to an unacceptably high degree, and said operator could possibly be seriously injured or even killed during the firefighting operation as a result.

OBJECT OF THE INVENTION

In contrast, the object of the present invention is to provide an E-extinguishing lance of the type defined at the outset with the simplest possible technical means, in an uncomplicated and cost-effective manner, by means of which extinguishing lance both the minimum requirements for protection against thermal hazards and for protection against mechanical overloads and also for protection against electrical hazards are reliably met.

BRIEF DESCRIPTION OF THE INVENTION

According to the invention, this object, which is in practice vital and life-saving for the operator, is achieved, in a manner that is as surprisingly simple as it is effective, by an E-extinguishing lance of the type defined at the outset, but which is suitable for truly safe work under electrical voltage, in that the tubular extinguishing portion has a voltage-insulating coating which is designed to be electrically insulating for electric voltages $U \geq 500$ V, at least in the region of the holding portion with handle part.

The present invention provides an E-extinguishing lance which completely achieves the object of the invention formulated above. In particular, the E-extinguishing lance according to the invention is especially also suitable for extinguishing lithium-ion batteries installed in electric vehicles. Fire departments thus now have an effective and completely safe extinguishing device at their disposal, even for use with burning objects under high voltage.

A striking plate, having a large surface area, at the operator-side end of the holding portion can be provided for establishing a flat body contact with an operator. A centrally mounted striking plate of this kind in particular ensures striking that is as straight as possible, in order to prevent bending of the E-extinguishing lance. In addition, a spacer portion with respect to the tubular extinguishing portion can also be provided, adjoining the striking plate.

In the case of use, the E-extinguishing lance can be introduced, for example, into the battery of a burning electric vehicle. Due to the tip in the foremost region, material, e.g., a battery wall, which is in the way can be easily penetrated. Such a high-strength but pointed nozzle prevents or at least minimizes wear, facilitating penetration into the surface of the object to be extinguished.

The flow-constricted nozzle(s) at the tip of the lance also ensure that sufficient extinguishing success can be achieved quickly and efficiently, and in particular using a relatively small amount of extinguishing water.

There is currently no alternative option anywhere on the market for extinguishing an E-vehicle battery in a manner which is direct and simultaneously safe for firefighters. In numerous tests, factory fire departments of well-known automotive manufacturers have hardly ever been able to get electric vehicle fires under control without the E-extinguishing lance according to the invention, and, if they have, then only when using an extremely large amount of water and foam, but always without effective safety for the acting firefighter against high electric voltages.

The situation is also very similar when extinguishing transformers or electrical generators which have caught fire—for example, in photovoltaic systems.

Preferred Embodiments of the Invention

A particularly advantageous class of embodiments of the E-extinguishing lance according to the invention is characterized in that the voltage-insulating coating of the tubular extinguishing portion has a layer thickness d≥2 mm, and in particular between 2 mm and 5 mm, at least in the region of the holding portion having the handle part, and that the voltage-insulating coating of the handle part of the holding portion and also of the extinguishing portion is designed to be electrically insulating for electric voltages U of up to 1,000 V and above. Thus, the handle part itself, in conjunction with the tubular extinguishing portion in the region of the holding portion, can now ensure sufficient protection of the operator against electrical voltages. Developments of this class of embodiments are particularly preferred which are characterized in that the voltage-insulating coating of the handle part and also of the extinguishing portion is also designed for electrical voltages U≥1,000 V.

In this connection, it is advantageous if the voltage-insulating coating of the handle part and also of the extinguishing portion is already sufficient for at least the minimum requirements of the European standards 60903 and/or 659 for insulating protective gloves for work under electrical voltage. It is, moreover, advantageous if the voltage-insulating coating of the handle part and also of the extinguishing portion is constructed from heat-insulating, flame-resistant material, e.g., using aramid and/or para-aramid, and also meets the minimum requirements of the European standard 407 for protective gloves against thermal risks.

It is particularly advantageous if the voltage-insulating coating of the handle part and also of the extinguishing portion is constructed from polyvinyl chloride. This ensures a longer service life of the coating. Aging phenomena are minimized.

Further particular advantages result in the case of embodiments in which the holding portion under the voltage-insulating coating of the handle part, as well as preferably also the tubular extinguishing portion and its tip, are made of metal-preferably of stainless steel, and in particular of austenitic, acid-resistant 18/10 Cr—Ni steel. The tip of the tubular extinguishing portion should be hardened. These materials have greater mechanical resistance and are chemically particularly resistant to the battery acid—for example, in the case of an E-vehicle to be extinguished. This and the above-mentioned preferred machining variant of the tip contribute to an increased mechanical and chemical resistance, and thus to longer durability.

In a further class of advantageous embodiments of the E-extinguishing lance according to the invention, the handle part of the holding portion has at least one bow handle with hand protection. This enables safe operability and good location of the battery. Furthermore, the bow-shaped handle serves as protection against undesired deformation of the lance when it is driven into the object to be extinguished.

The embodiments of this class can be further improved by developments in which the handle part of the holding portion has two bow handles for operation of the E-extinguishing lance with both hands. This ensures safe operability and location in the object to be extinguished into which it is to be penetrated.

Further advantageous embodiments are characterized in that an actuating valve for letting in or stopping an extinguishing agent inflow into the tubular extinguishing portion is provided on the extinguishing agent feed, and a trigger device for manual actuation of the actuating valve is provided on the holding portion, and preferably on the handle part.

Embodiments of the E-extinguishing lance according to the invention are also preferred in which the free end of the tubular extinguishing portion is designed to taper—in particular, conically. In this way, a particularly straight and slight impact into the object to be extinguished is made possible.

These embodiments can very particularly preferably be developed in that the tip of the tubular extinguishing portion has a maximum outer diameter which is between ⅓ and ¾, and preferably between ½ and ⅔, of the outer diameter of the tubular extinguishing portion. In various E-vehicle models, the battery is installed on almost the entire base plate, but only approximately 4-5 cm thick. The E-extinguishing lance is introduced, for extinguishing, into the battery through the base plate. In the case of the lance tip known hitherto, however, there is now the risk (and, according to information from the factory fire departments of well-known vehicle manufacturers, this has also already happened) that the lance tip passes through the battery, and the extinguishing agent is then not distributed in the burning battery in a targeted manner. The driving depth is now limited, by the new design of the tip proposed here, in such a way that smashing straight through the battery case is not possible, or is possible only with very significant additional force application. As a result of the maximum outer diameter of the tubular extinguishing portion following the tip, which is now greater compared with the blunt cone end of the tip, specifically, a noticeable and considerable mechanical resistance results when the E-extinguishing lance is driven in, as soon as the tip has penetrated into the battery.

In particularly advantageous variants of these developments, a transition portion is arranged between the conically-tapering free end and the adjoining tubular extinguishing portion, which transition portion is geometrically designed such that it transfers the maximum outer diameter of the conical free end at a cone angle of between 55° and 85°, and preferably approximately 70°, to the full outer diameter of the tubular extinguishing portion.

This transition portion ensures a noticeable increase in the mechanical resistance when the extinguishing lance is driven into the object to be extinguished.

In practice, embodiments of these variants prove successful in which a cylindrical intermediate portion having an axial length $L_{ZA}$ of between 30 mm and 80 mm, and preferably about 50 mm, is arranged between the maximum outer diameter of the conical free end and the transition portion, the diameter of which intermediate portion corresponds to the maximum outer diameter of the conical free end and which transfers the conical free end to the beginning of the transition portion at the minimum outer diameter thereof. The cylindrical intermediate portion initially ensures a constant mechanical resistance, upon driving in the extinguishing lance, after the tip has penetrated, into the object to be extinguished, before the above-described transition portion then again decelerates further advance of the extinguishing lance tip.

Embodiments are also found to be particularly favorable and simple to produce in which the conically-tapering free end of the tubular extinguishing portion is formed in one piece with the transition portion, and optionally also in one piece with the cylindrical intermediate portion and the cylindrical connecting portion.

Very particularly preferred is a class of embodiments in which the tapering free end of the tubular extinguishing portion, and optionally also the transition portion, the cylindrical intermediate portion, and the cylindrical connecting portion, is designed as an interchangeable tip with respect to the tubular extinguishing portion. As a result, the E-extinguishing lance can also be used for other extinguishing agent variants. Furthermore, the tip can thus be changed quickly and easily for another one in the case of wear. Since temperatures up to 1,000° C. occur as a result of the fire of, for example, a lithium ion battery in an E-vehicle, the increase in wear of the tip can result in the need for the replacement.

Advantageous developments of this class of embodiments are characterized in that different interchangeable tips-preferably having different geometries, diameters, and in particular different materials—can be delivered and held in stock for a wide variety of applications. As a result, the E-extinguishing lance according to the invention can be quickly made operational again in the event of wear. Also, precisely in the case of use on-site, the tip can also be changed quickly.

Developments are also preferred in which the interchangeable tip(s) is/are provided with a screw thread or, for example, also a bayonet lock for releasable fastening to the tubular extinguishing portion, wherein preferably two holding points for wrenches are present, for the purpose of easy disassembly. As a result, the lance can be quickly made operational again in the event of wear, and the tip can also be changed quickly during use.

Variants are particularly practical in which the cylindrical connecting portion and, if applicable, also the transition portion have a chamfer as an attachment surface for a wrench for easy assembly and disassembly of the interchangeable tip.

In a further class of advantageous embodiments of the E-extinguishing lance according to the invention, at least one nozzle for the discharge of liquid extinguishing agent under pressure is integrated into the tapering free end of the tubular extinguishing portion, wherein the nozzle preferably is shaped in such a way that it optimally injects extinguishing agent into the burning object and/or distributes it on the surface of said object. In this way, only comparatively small amounts of extinguishing agent are required.

In practice, developments of this class of embodiments prove successful in which the nozzle has a hollow diameter of between 30 mm and 40 mm, and preferably approximately 33.7 mm, a length of between 25 mm and 50 mm, and preferably approximately 30 mm, and a width of between 15 mm and 25 mm, and preferably 21.3 mm. These special dimensions in particular also have advantages in terms of production.

Finally, other advantageous developments of this class of embodiment forms are characterized in that three nozzles arranged uniformly distributed around the longitudinal axis of the tubular extinguishing portion are provided. In this way, a targeted and uniform penetration of the extinguishing agent into the object to be extinguished can be ensured during use.

In practice, a class of embodiments of the extinguishing lance according to the invention proves very particularly favorable in which the holding portion has a striking portion in extension to the tubular extinguishing portion, at the operator-side end, the operator side end face of which striking portion is designed as a striking plate having a large surface area, and has a larger outer diameter than the tubular extinguishing portion-preferably between 1.5 times and 2.5 times the outer diameter of the tubular extinguishing portion—and in particular an outer diameter at least twice as large. Preferably, the striking portion is made of solid material, and in particular of metal, and is particularly preferably interchangeable—in particular, in the form of a striking pin that can be plugged or screwed onto the handle part in extension of the longitudinal axis of the tubular extinguishing portion. A sufficiently large surface area for introducing mechanical force in the direction of the longitudinal axis of the extinguishing lance is thus made available, such that the lance can be driven quickly and precisely into the object to be extinguished.

An advantageous development of this class of embodiments is characterized in that the striking plate is of a cylindrical shape having at least one, and preferably two, chamfer surfaces located opposite one another in parallel. In the case of a striking head that has a completely round circumference, the striking hammer does not always strike centrally, which impedes the penetration of the E-extinguishing lance into the object to be extinguished. In the extreme case, the screw thread can be knocked crooked by the striking effect in the case of an interchangeable striking head. In order to distribute the striking effect more uniformly, it is therefore proposed to enlarge the thread slightly and to remove the rounded portions from the striking head in the front and rear regions. The operator thus now always strikes the hammer head centrally.

In order to ensure personal protection during extinguishing of burning E-vehicles, the E-extinguishing lance according to the invention is designed having the above-described electrical insulation in the handle region. For the most unlikely case that the positive pole of the vehicle battery is electrically connected to the negative pole in the event of an accident, a discharging connection to the ground potential should be established.

Therefore, additionally or alternatively, in further developments, a first grounding device for establishing an electrically conductive connection to the voltage potential of the earth, which in particular comprises a grounding screw and a grounding cable, can be present on the striking portion, and preferably on the part of the striking portion following the striking plate, having a large surface area, in the axial direction of the tubular extinguishing portion.

For these reasons, embodiments of the invention are also particularly preferred in which the coupling device for connecting a pressure hose for liquid extinguishing agent has a second grounding device for establishing an electrically conductive connection to a voltage potential of the earth, which in particular comprises a grounding nut and a second grounding cable.

Intensive fire tests have shown that, depending upon the place of use and vehicle type, faster extinguishing success can be achieved with variable-length E-extinguishing lances. Extremely different scenarios arise precisely in the case of vehicle accidents. Sometimes there is only very little space, and then a short design is expedient. At times, the lance must be introduced through a side panel and through the vehicle floor, and then the rescue workers need the extension.

Therefore, embodiments are very particularly advantageous in which the extinguishing lance, and in particular the striking portion, is formed so as to be divisible. The extinguishing lance according to the invention can thus be used particularly flexibly—for example, in the event of a fire of a vehicle in its own garage or in a parking garage. In this connection, cases, for example, of spontaneous ignition of lithium ion batteries which have led to fires in buildings and considerable damage have been reported in the press.

In favorable developments, the extinguishing lance is designed to be extendable with respect to its longitudinal axis, wherein in particular the striking plate of the striking portion is arranged, at the operator-side end, at a variable distance from the tubular extinguishing portion. As a result of this embodiment, the extinguishing lance is particularly suitable for use in trucks and other large vehicles.

Preferably, the tubular extinguishing portion is, in turn, also designed to be extendable—in particular, by means of one or more tubular extension pieces which have the same outer diameter as the tubular extinguishing portion. This also achieves increased flexibility in the application.

Further features and advantages of the invention are apparent from the following detailed description of an embodiment of the invention with reference to the figures of the drawings, which show details essential to the invention, and from the claims. The individual features can each be implemented individually or together in any combination in variants of the invention. The embodiments shown and described are not to be understood as an exhaustive list, but, rather, have an exemplary character for the description of the invention.

DETAILED DESCRIPTION OF THE INVENTION AND DRAWINGS

Figure 1B:
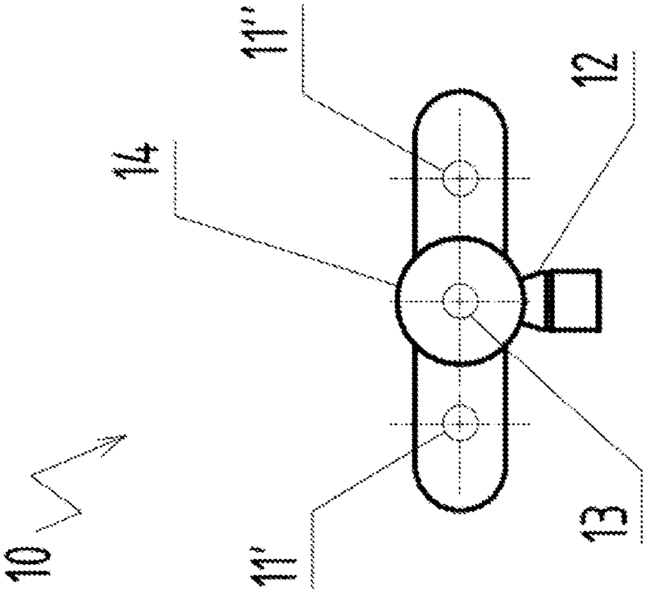
Figure 2B:
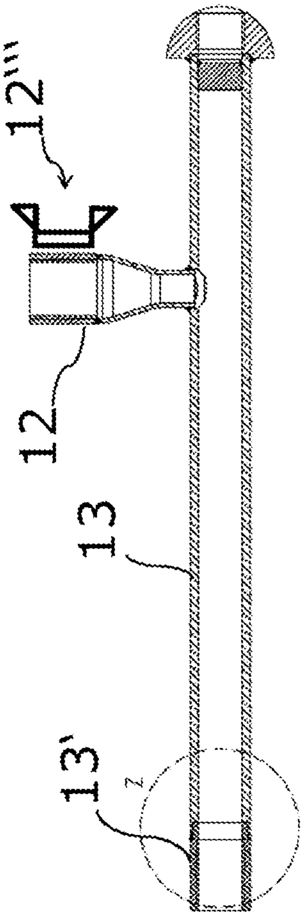
Figure 2C:
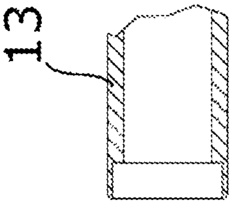
Figure 2A:
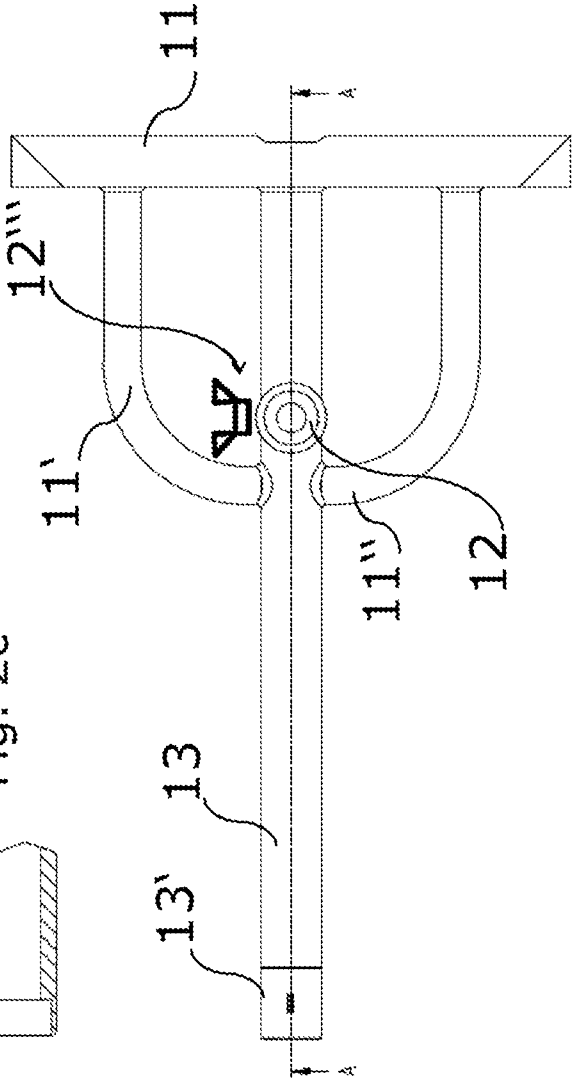
Figure 3A:
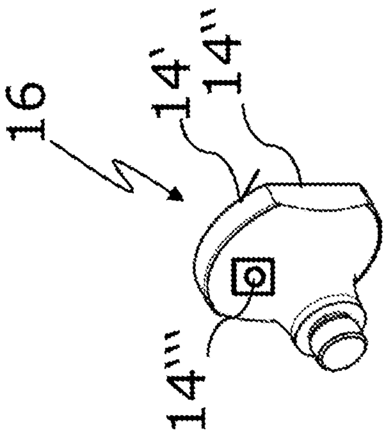
Figure 3B:
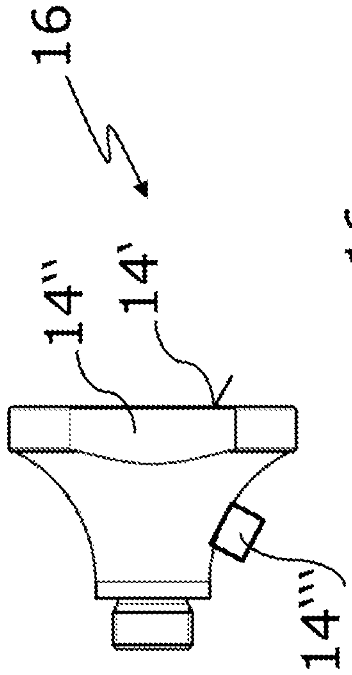
Figure 3C:
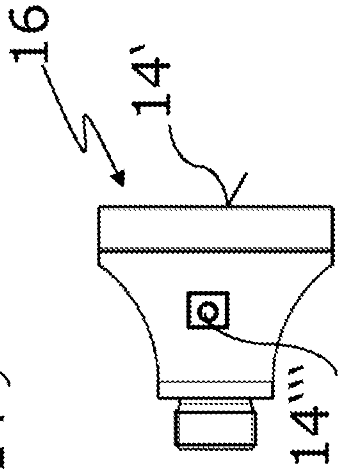
Figure 4D:
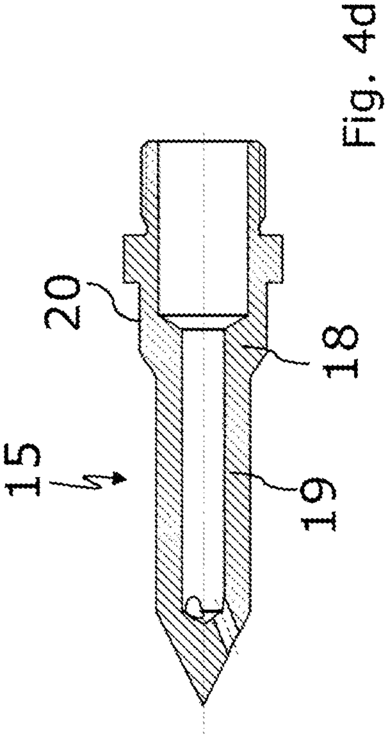
Figure 4A:
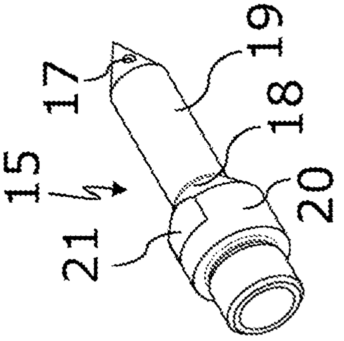
Figure 4E:
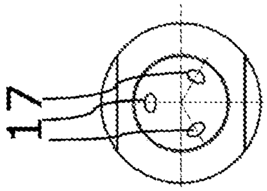
Figure 4B:
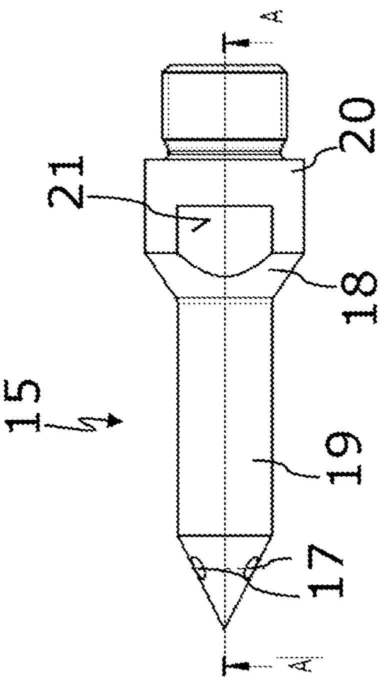
Figure 4C:
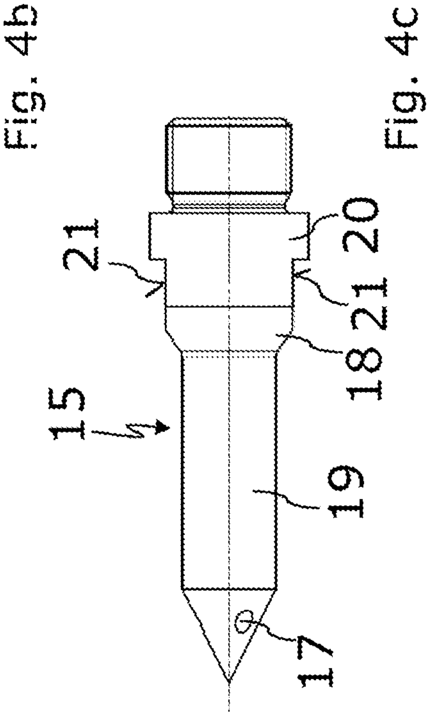
Figure 5A:
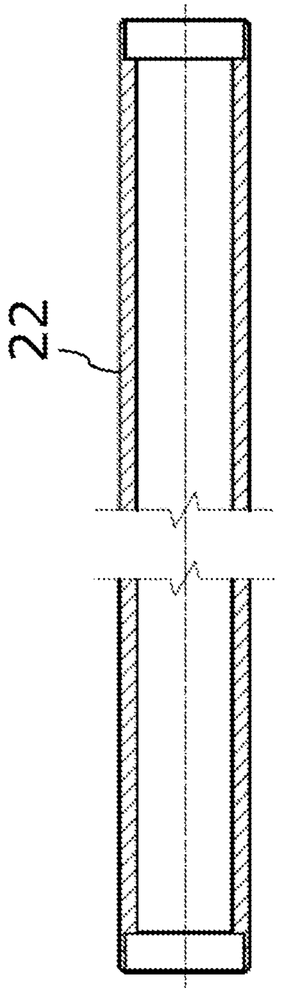
Figure 5B:
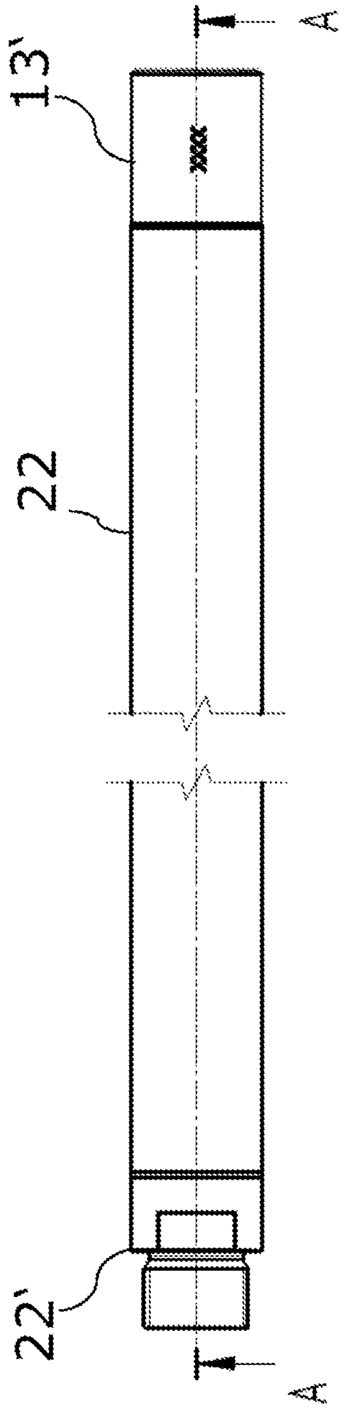
Figure 5E:
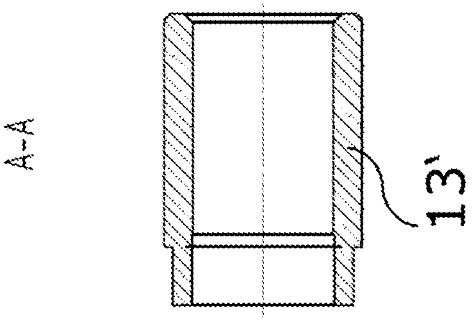
Figure 5F:
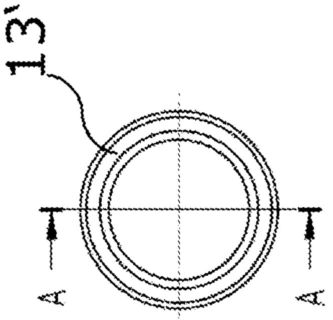
Figure 5D:
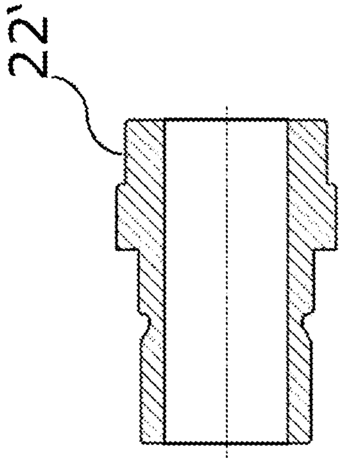
Figure 5C:
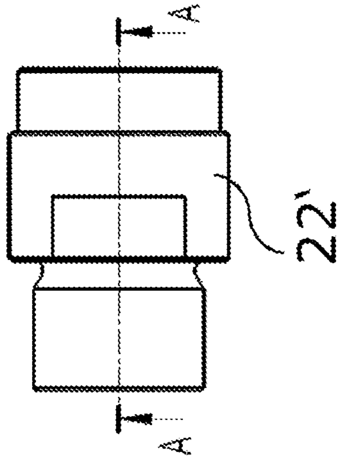

The invention is shown in the figures of the drawing, which are substantially kept rather schematic, and is explained in more detail with reference to an exemplary embodiment. In the drawings:

FIG. 1*a* is a schematic side view of a first embodiment of the E-extinguishing lance according to the invention having a voltage-insulating coating of the tubular extinguishing portion in the region of the holding handle;

FIG. 1*b* shows the embodiment of FIG. 1*a* in a partially transparent view from above, in the direction of the axis of the tubular extinguishing portion;

FIG. 2*a* is a detailed view of a further embodiment of the E-extinguishing lance according to the invention in the region of the holding handle having bows extending to the tubular extinguishing portion and having a wing nut at the coupling device for extinguishing water;

FIG. 2*b* shows the embodiment of FIG. 2*a* in a vertical, longitudinal sectional view from the side;

FIG. 2*c* shows the detail Z of FIG. 2*b* having a receptacle for a weld bushing on the tubular extinguishing portion;

FIG. 3*a* is a schematic, three-dimensional view of a striking pin having a rear striking plate, chamfer surface, and grounding screw for applying to the handle part in extension of the longitudinal axis of the tubular extinguishing portion;

FIG. 3*b* is a side view of the embodiment of FIG. 3*a* with a view of the chamfer surface;

FIG. 3*c* is a side view of FIG. 3*b* rotated by 90° about the longitudinal axis, with a view onto the grounding screw;

FIG. 4*a* is a schematic, three-dimensional view of an interchangeable tip of the tubular extinguishing portion;

FIG. 4*b* is a schematic side view of the tip according to FIG. 4*a* with a view of one of the two opposing chamfer surfaces;

FIG. 4*c* shows the embodiment of FIG. 4*b* rotated by 90° about the longitudinal axis of the tip, with a view in each case from the side onto the two, mutually-opposing chamfer surfaces;

FIG. 4*d* shows the embodiment of the tip from FIG. 4*c* in a vertical longitudinal section;

FIG. 4*e* is an enlarged detail view of the nozzle distribution of the tip from FIG. 4*c*, with a viewing direction parallel to the longitudinal axis of the tip;

FIG. 5*a* is a vertical, longitudinal sectional view of an extension piece for extending the axial length of the tubular extinguishing portion;

FIG. 5*b* is a side view of the extension piece from FIG. 5*a* in the viewing direction perpendicular to the longitudinal axis, having in each case one welding bushing at both ends for installing the extension piece in the tubular extinguishing portion;

FIG. 5*c* is an enlarged side view of the left-hand welding bushing of the extension piece of FIG. 5*b;*

FIG. 5*d* is a vertical, longitudinal sectional view of the welding bushing of FIG. 5*c;*

FIG. 5*e* is an enlarged side view of the right-hand welding bushing of the extension piece from FIG. 5*b* in a vertical longitudinal section; and FIG. 5*f* shows the welding bushing from FIG. 5*e* with a viewing direction parallel to the longitudinal axis of the right-hand welding bushing.

FIGS. 1*a* and 1*b* of the drawings show an embodiment of the electrically insulating E-extinguishing lance 10 according to the invention for extinguishing burning objects under electric voltage. Just like the extinguishing lance known from the closest prior art, from the applicant itself, the E-extinguishing lance 10 according to the invention also has a holding portion having a handle part 11 for an operator, an extinguishing-agent feed having a coupling device 12 for connecting a pressure hose for liquid extinguishing agent, and a tubular extinguishing portion 13 which adjoins the holding portion and optionally the coupling device 12, and from the free end of which extinguishing agent can be introduced under pressure into a burning object. The handle part 11 of the holding portion has a voltage-insulating coating 11*a* which is designed to be electrically insulating for electric voltages U≥500 V, wherein the tubular extinguishing portion 13 is geometrically tapered at the free end thereof and has a constricted, hollow flow cross-section for the extinguishing agent conducted through under pressure.

Compared to such a known, older extinguishing lance by the applicant, mentioned above, the E-extinguishing lance 10 according to the invention is characterized in that the tubular extinguishing portion 13, at least in the region of the holding portion having the handle part 11, now also has a voltage-insulating coating 13*a* which is designed to be electrically insulating for electric voltages U≥500 V.

In particular, this voltage-insulating coating 13*a* of the tubular extinguishing portion 13 can have a layer thickness d≥2 mm, and in particular between 2 mm and 5 mm, at least in the region of the holding portion having the handle part 11, and the voltage-insulating coating 11*a* of the handle part 11 of the holding portion and also the coating 13*a* of the extinguishing portion 13 can even be designed to be electrically insulating for electric voltages U of up to 1,000 V and above.

Furthermore, the tubular extinguishing portion 13 can be made of stainless steel, and in particular austenitic, acid-resistant 18/10 Cr—Ni steel, and the voltage-insulating coating 13*a* of the tubular extinguishing portion 13 can be made of polyvinyl chloride.

In the embodiment shown in FIGS. 1*a* and 1*b*, the handle part 11 of the holding portion has two bow handles 11', 11" for two-handed operation of the E-extinguishing lance 10.

The E-extinguishing lance 10 according to the invention can, on the extinguishing-agent feed, have an actuating valve (not shown) for admitting or stopping an inflow of extinguishing agent into the tubular extinguishing portion 13, and, on the holding portion-preferably on the handle part 11-*a* trigger device for manually actuating said actuating valve.

Furthermore, the embodiment of the E-extinguishing lance 10 shown in FIG. 1*a* has a preferably interchangeable striking portion 14 at the operator-side end, following the holding portion, in extension of the tubular extinguishing portion 13, which striking portion serves to introduce striking force in the direction of the longitudinal axis of the E-extinguishing lance 10, in order to drive said extinguishing lance into an object to be extinguished. On the side remote from the operator, in this case, the free end of the E-extinguishing lance 10 is designed as a tip 15 which is preferably also interchangeable and in particular hardened.

FIGS. 2*a* through 2*c* show in enlarged detail the region around the holding portion having the grip 11, the extinguishing-agent feed having the coupling device 12 for connecting a pressure hose for liquid extinguishing agent, and the tubular extinguishing portion 13 adjoining the holding portion and the coupling device 12.

The coupling device 12 has a grounding device for establishing an electrically conductive connection to the electrical potential of the earth, which, in the embodiment shown, comprises a grounding nut 12" and a grounding cable (not shown specifically in the drawing).

In addition, a welding bushing 13', which enables an extension of the E-extinguishing lance 10 according to the invention, as explained in more detail below with reference to FIGS. 5*a-f*, is provided in a manner axially following the tubular extinguishing portion 13.

FIGS. 3*a* through 3*c* show in enlarged detail a striking pin 16, which in this case forms the striking portion 14 and which can be plugged or screwed onto the holding portion of the E-extinguishing lance 10, and more precisely onto the handle part 11 in extension of the longitudinal axis of the tubular extinguishing portion 13. Its operator-side end face is designed as a striking plate 14' having a large surface area and has a larger outer diameter than the tubular extinguishing portion 13—preferably between 1.5 times and 2.5 times the outer diameter of the tubular extinguishing portion 13. The striking pin 16 is preferably made of solid material, and in particular metal.

In this embodiment, the striking plate 14' has a cylindrical closure having a large, operator-side striking surface. In addition, two chamfer surfaces 14' opposite one another in parallel are here provided, which can serve as attachment surfaces for tools for easier assembly and disassembly of the striking pin 16 on the handle part 11. Furthermore, a grounding device for establishing an electrically conductive connection to the voltage potential of the earth is present, which in this case comprises a grounding screw 14" and a grounding cable (not shown specifically in the drawing).

The mounting of the striking pin 16 on the handle part 11 can take place, for example, by screwing or plugging in—for example, by means of a bayonet lock.

FIGS. 4*a* through 4*e* show in enlarged detail the tapering free end of the E-extinguishing lance 10 according to the invention, which is designed as an interchangeable, conically-tapering tip 15 in this embodiment, wherein it is possible for different interchangeable tips 15—preferably having various geometries, diameters, and in particular made of different materials having different material properties—to be kept available for different intended uses.

Particularly preferably, the conically-tapering free end of the E-extinguishing lance 10 according to the invention has a maximum outer diameter which is between ⅓ and ¾, and preferably between ½ and ⅔, of the outer diameter of the tubular extinguishing portion 13.

As a rule, at least one, and preferably three, nozzles 17, arranged so as to be uniformly distributed about the longitudinal axis of the tubular extinguishing portion 13, for the exit of pressurized liquid extinguishing agent are integrated in the tapering free end of the tubular extinguishing portion 13 (see, in particular, FIG. 4*e*), wherein the nozzles preferably are shaped such that they inject extinguishing agent optimally into the burning object and/or distribute said extinguishing agent on the surface of said object.

Between the conically-tapering free end and the adjoining tubular extinguishing portion 13, a transition portion 18 is arranged, which is geometrically designed such that it transfers the maximum outer diameter of the conical free end at a cone angle of between 55° and 85°—in the exemplary embodiment shown, approximately 70°—to the full outer diameter of the tubular extinguishing portion 13.

Between the maximum outer diameter of the conical free end and the transition portion 18, in this case, a cylindrical intermediate portion 19 having an axial length $L_{ZA}$ of between 30 mm and 80 mm, and preferably approximately 50 mm, is arranged, the diameter of which intermediate portion corresponds to the maximum outer diameter of the conical free end and which transfers the conical free end to the beginning of the transition portion 18 at its minimum outer diameter.

When the E-extinguishing lance 10 according to the invention is driven, by means of the tip 15, into a solid object to be extinguished-often, an electrical battery—the tip initially penetrates into the object quickly, up to the operator-side end of the cylindrical intermediate portion 19. However, the transition portion 18 then ensures an increasing mechanical resistance. As a result, the operating firefighter detects that the tip 15 has now already penetrated into the object over somewhat more than the length of the conical end piece and the cylindrical intermediate portion 19. Said firefighter will therefore at this moment quickly terminate the application of force to the striking portion 14, in order to not completely penetrate the object and then end up having the extinguishing tip and the nozzles 17 outside the object, which would make effective extinguishing significantly more difficult or even impossible.

Between the maximum outer diameter of the transition portion 18 and the beginning of the tubular extinguishing portion 13, in the embodiment shown, a cylindrical connecting portion 20 having an axial length $L_{AA}$ of between 10 mm and 30 mm, and preferably approximately 20 mm, is arranged, the diameter of which connecting portion corresponds to the outer diameter of the tubular extinguishing portion 13, and which transfers the transition portion 18 to the beginning of the tubular extinguishing portion 13.

The cylindrical connecting portion 20 and optionally also a smaller part of the transition portion 18 has two, mutually-opposing chamfers 21 which can serve as attachment surfaces for a wrench for easier assembly and disassembly of the interchangeable tip 15.

The interchangeable tip 15 can be provided with a screw thread (not shown in the drawing) or a bayonet lock for releasable fastening to the tubular extinguishing portion 13.

FIGS. 5*a* through 5*f* show, in part in enlarged detail, auxiliary devices for axial extension of the E-extinguishing lance 10 according to the invention with respect to its longitudinal axis.

For this purpose, the tubular extinguishing portion 13 can in turn be designed to be extendable—in particular, by means of one or more tubular extension pieces 22, as shown in FIGS. 5*a* and 5*b*, and which have the same outer diameter as the operator-side first part of the tubular extinguishing portion 13.

For installing an extension piece 22 in the tubular extinguishing portion 13, in the embodiments shown, connection means are provided at one or both axial ends of the extension piece 22.

FIGS. 5*e* and 5*f* are detailed views of a first welding bushing 13', which can also already be seen in FIGS. 1*a*, 2*a*, and 2*b*. In the case of the extension piece 22 shown in FIG. 5*b*, this first welding bushing 13' is arranged at the right-hand end of the extension piece 22.

A further welding bushing 22' at the left-hand end of the extension piece 22 shown in FIG. 5*b* is shown in greater detail in FIGS. 5*c* and 5*d*.

Additionally or alternatively, the striking plate 14', having a large surface area, of the striking portion 14, can also be arranged at the operator-side end of the holding portion at a variable distance from the tubular extinguishing portion 13.

LIST OF REFERENCE SIGNS

10 extinguishing lance
11 handle part
11', 11" bow handles of the handle part
11*a* voltage-insulating coating of the handle part
12 coupling device
12" grounding nut
13 tubular extinguishing portion
13*a* voltage-insulating coating of the tubular extinguishing portion
13' first welding bushing in the tubular extinguishing portion
14 striking portion
14' striking plate
14" chamfer surfaces
14''' grounding screw
15 tip of the tubular extinguishing portion
16 striking mandrel
17 nozzles
18 transition portion
19 intermediate portion
20 connecting portion
21 chamfer
22 extension piece
22 further welding bushing in the extension piece

The invention claimed is:

1. An extinguishing lance (10) for extinguishing electric devices that are burning, such as vehicles equipped with an electric motor, comprising:

a holding portion having a handle part (11) for an operator, an extinguishing agent feed having a coupling device (12) for connecting a pressure hose for liquid extinguishing agent, and a tubular extinguishing portion (13) adjoining the holding portion, from the free end of which extinguishing portion extinguishing agent, under pressure, can be introduced into a burning object, wherein the handle part (11) of the holding portion has a voltage-insulating coating (11*a*) which is designed so as to be electrically insulating even for electric voltages U≥500 V, wherein the tubular extinguishing portion (13) is made of a material which has a strength $R_m$ that withstands a mechanical stress $\sigma \geq 500$ N/mm$^2$, and which has a melting temperature $t_S \geq 650°$ C., wherein the tubular extinguishing portion (13) has a geometrically tapering free end and has a constricted, hollow flow cross-section for the extinguishing agent conducted through under pressure, wherein the tubular extinguishing portion (13) and also the tapering free end of the tubular extinguishing portion (13) are made of stainless steel, and wherein the tapering free end of the tubular extinguishing portion (13) additionally is hardened, wherein the tubular extinguishing portion (13) has, at least in a region of the holding portion also outside the handle part (11), a voltage-insulating coating (13*a*), which is electrically insulating for electric voltages U≥500 V, wherein the geometrically tapering free end of the tubular extinguishing portion (13) is a conically tapering free end, and has a maximum outer diameter that is between ⅓ and ¾ of an outer diameter of the tubular extinguishing portion (13) outside the conically tapering free end, and wherein a tapering transition portion (18) is arranged directly between the conically-tapering free end and the adjoining tubular extinguishing portion (13), which transition portion (18) is geometrically designed so as to transfer a maximum outer diameter of the conically tapering free end at a cone angle of between 55° and 85° to a full outer diameter of the tubular extinguishing portion (13), wherein the transition portion is configured to supply an increasing mechanical resistance to penetration of an object by the tubular extinguishing portion once the conically tapering free end has penetrated the object.

2. The extinguishing lance according to claim 1, wherein the voltage-insulating coating (13*a*) of the tubular extinguishing portion (13) has a layer thickness d≥2 mm, at least in a region of the holding portion with the handle part (11), and wherein the voltage-insulating coating (11*a*) of the handle part (11) of the holding portion and also the coating (13*a*) of the extinguishing portion (13) are designed to be electrically insulating for electric voltages U up to 1,000 V and above.

3. The extinguishing lance according to claim 1, wherein the tubular extinguishing portion (13) is made austenitic, acid-resistant 18/10 Cr—Ni steel, and the voltage-insulating coating (13*a*) of the tubular extinguishing portion (13) is made of polyvinyl chloride.

4. The extinguishing lance according to claim 1, wherein the conically tapering free end of the tubular extinguishing portion (13) has a maximum diameter that is between ½ and ⅔ of the outer diameter of the tubular extinguishing portion (13) outside the conically tapering free end.

5. The extinguishing lance according to claim 4, wherein the transition portion (18) is geometrically designed such that the transition portion transfers the maximum outer diameter of the conically tapering free end at a cone angle of 70° to the full outer diameter of the tubular extinguishing portion (13).

6. The extinguishing lance according to claim 5, wherein, between the maximum outer diameter of the conically tapering free end and the transition portion (18), a cylindrical intermediate portion (19) having an axial length $L_{ZA}$ of between 30 mm and 80 mm is arranged, a diameter of which intermediate portion corresponds to the maximum outer diameter of the conically tapering free end, and which transfers the conically tapering free end to a beginning of the transition portion (18) at a minimum outer diameter of the transition portion.

7. The extinguishing lance according to claim 5, wherein a cylindrical connecting portion (20) having the axial length $L_{AA}$ of between 10 mm and 30 mm is arranged between the maximum outer diameter of the transition portion (18) and a beginning of the tubular extinguishing portion (13), the diameter of which connecting portion corresponds to the outer diameter of the tubular extinguishing portion (13), and which transfers the transition portion (18) to the beginning of the tubular extinguishing portion (13).

8. The extinguishing lance according to claim 5, wherein the conically-tapering free end of the tubular extinguishing portion (13) is formed in one piece with the transition portion (18).

9. The extinguishing lance according to claim 7, wherein the conically-tapering free end of the tubular extinguishing portion (13) is designed as an exchangeable tip (15) with respect to the tubular extinguishing portion (13) and is provided with a screw thread or a bayonet lock for releasable fastening to the tubular extinguishing portion (13).

10. The extinguishing lance according to claim 9, wherein the cylindrical connecting portion (20) has a chamfer (21) as an attachment surface for a wrench for assembly and disassembly of the exchangeable tip (15).

11. The extinguishing lance according to claim 1, wherein the holding portion at an operator-side end has a striking portion (14) in extension of the tubular extinguishing portion (13), an operator-side end surface of which is designed as a striking plate (14') having a large surface area, and has a larger outer diameter than the diameter of the tubular extinguishing portion (13) and wherein the striking portion (14) is made of solid material and is designed so as to be interchangeable, in the form of a striking pin (16) which can be plugged or screwed onto the handle part (11) in extension of the longitudinal axis of the tubular extinguishing portion (13).

12. The extinguishing lance according to claim 11, wherein the striking plate (14') has a cylindrical shape having at least one chamfer surface (14").

13. The extinguishing lance according to claim 11, wherein a first grounding device for establishing an electrically conductive connection to the voltage potential of the earth is present on the striking portion (14), said grounding device comprising a grounding screw (14") and a grounding cable.

14. The extinguishing lance according to claim 13, wherein the coupling device (12) for connecting a pressure hose for liquid extinguishing agent has a second grounding device for establishing an electrically conductive connection with a voltage potential of the earth, which comprises a grounding nut (12") and a second grounding cable.

15. The extinguishing lance according to claim 11, wherein the extinguishing lance (10) is designed to be extendable with respect to a longitudinal axis, wherein the striking plate (14'), having a large surface area, of the striking portion (14) is arranged at the operator-side end of the holding portion at a variable distance from the tubular extinguishing portion (13), and/or wherein the tubular extinguishing portion (13) in turn is designed to be extendable by means of one or more tubular extension pieces (22) which have the same outer diameter as the tubular extinguishing portion (13).

* * * * *